United States Patent
Gruhn et al.

(10) Patent No.: US 8,301,445 B2
(45) Date of Patent: Oct. 30, 2012

(54) SPEECH RECOGNITION BASED ON A MULTILINGUAL ACOUSTIC MODEL

(75) Inventors: Rainer Gruhn, Ulm (DE); Martin Raab, Ulm (DE); Raymond Brueckner, Blaustein (DE)

(73) Assignee: Nuance Communications, Inc., Burlington, MA (US)

( * ) Notice: Subject to any disclaimer, the term of this patent is extended or adjusted under 35 U.S.C. 154(b) by 359 days.

(21) Appl. No.: 12/625,819

(22) Filed: Nov. 25, 2009

(65) Prior Publication Data

US 2010/0131262 A1 May 27, 2010

(30) Foreign Application Priority Data

Nov. 27, 2008 (EP) .................................... 08020639

(51) Int. Cl.
*G06F 17/20* (2006.01)
*G10L 15/06* (2006.01)

(52) U.S. Cl. .............................. 704/243; 704/8; 704/231

(58) Field of Classification Search .................. 704/231, 704/240–245
See application file for complete search history.

(56) References Cited

U.S. PATENT DOCUMENTS

| | | | |
|---|---|---|---|
| 6,460,017 B1 * | 10/2002 | Bub et al. ....................... | 704/256 |
| 6,915,260 B2 * | 7/2005 | Botterweck .................... | 704/250 |
| 6,917,919 B2 * | 7/2005 | Botterweck .................... | 704/255 |
| 7,457,745 B2 * | 11/2008 | Kadambe et al. ............. | 704/216 |
| 2006/0053014 A1 * | 3/2006 | Yoshizawa ................. | 704/256.4 |
| 2006/0058999 A1 * | 3/2006 | Barker et al. ................. | 704/256 |
| 2007/0294082 A1 * | 12/2007 | Jouvet et al. .................. | 704/231 |
| 2008/0201136 A1 * | 8/2008 | Fujimura et al. .............. | 704/201 |
| 2008/0255839 A1 * | 10/2008 | Larri et al. ..................... | 704/238 |
| 2009/0055162 A1 * | 2/2009 | Qian et al. ........................ | 704/8 |
| 2010/0131262 A1 * | 5/2010 | Gruhn et al. ...................... | 704/8 |

OTHER PUBLICATIONS

Raab, M, et al., "Multilingual Weighted Codebooks for Non-Native Speech Recognition," *Proceedings of the 11th* Int'l Conference on Text, Speech and Dialogue., vol. 5426, Sep. 8, 2008, pp. 495-492.
European Patent Officer—Extended European Search Report; Application No. 08020639.4-1224; May 20, 2009.

* cited by examiner

*Primary Examiner* — Douglas Godbold
(74) *Attorney, Agent, or Firm* — Sunstein Kann Murphy & Timbers LLP

(57) ABSTRACT

Embodiments of the invention relate to methods for generating a multilingual acoustic model. A main acoustic model comprising a main acoustic model having probability distribution functions and a probabilistic state sequence model including first states is provided to a processor. At least one second acoustic model including probability distribution functions and a probabilistic state sequence model including states is also provided to the processor. The processor replaces each of the probability distribution functions of the at least one second acoustic model by one of the probability distribution functions and/or each of the states of the probabilistic state sequence model of the at least one second acoustic model with the state of the probabilistic state sequence model of the main acoustic model based on a criteria set to obtain at least one modified second acoustic model. The criteria set may be a distance measurement. The processor then combines the main acoustic model and the at least one modified second acoustic model to obtain the multilingual acoustic model.

7 Claims, 2 Drawing Sheets

SPEECH RECOGNITION BASED ON A MULTILINGUAL ACOUSTIC MODEL

PRIORITY

The present U.S. patent application claims priority from European Patent Application No. 08 020 639.4 entitled Speech Recognition Based On A Multilingual Acoustic Model filed on Nov. 27, 2008, which is incorporated herein by reference in its entirety.

TECHNICAL FIELD

The present invention relates to the art of automatic speech recognition and, in particular, the generation of an acoustic model for speech recognition of spoken utterances in different languages.

BACKGROUND ART

The human voice can probably be considered as the most natural and comfortable man-computer interface. Voice input provides the advantages of hands-free operation, thereby, e.g., providing access for physically challenged users or users that are using there hands for different operation, e.g., driving a car. Thus, computer users for a long time desired software applications that can be operated by verbal utterances.

During speech recognition verbal utterances, either isolated words or continuous speech, are captured by a microphone or a telephone, for example, and converted to analogue electronic signals that subsequently are digitized. The digital signals are usually subject to a subsequent spectral analysis. Recent representations of the speech waveforms sampled typically at a rate between 6.6 kHz and 20 kHz are derived from the short term power spectra and represent a sequence of characterizing vectors containing values of what is generally referred to as features/feature parameters. The values of the feature parameters are used in succeeding stages in the estimation of the probability that the portion of the analyzed waveform corresponds to, for example, a particular entry, i.e. a word, in a vocabulary list.

Present-day speech recognition systems usually make use of acoustic and language models. The acoustic models comprise codebooks consisting of Gaussians representing typical sounds of human speech and Hidden Markov Models (HMMs). The HMMs represent allophones/phonemes a concatenation of which constitute a linguistic word. The HMMs are characterized by a sequence of states each of which has a well-defined transition probability. In order to recognize a spoken word, the systems have to compute the most likely sequence of states through the HMM. This calculation is usually performed by means of the Viterbi algorithm, which iteratively determines the most likely path through the associated trellis. The language model, on the other hand, describes the probabilities of sequences of words and/or a particular grammar.

The reliability of the correct speech recognition of a verbal utterance of an operator is a main task in the art of speech recognition/operation and despite recent progress still raises demanding problems, in particular, in the context of embedded systems that suffer from severe memory and processor limitations. These problems are eminently considerable when speech inputs of different languages are to be expected. A driver of car, say a German mother-tongue driver, might need to input an expression, e.g., representing a town, in a foreign language, say in English. To give another example, different native users of an MP3/MP4 player or a similar audio device will assign tags in different languages. Furthermore, titles of songs stored in the player may be of different languages (e.g., English, French, German).

Present day speech recognition and control means usually comprise codebooks that are commonly generated by the (generalized) Linde-Buzo-Gray (LBG) algorithm or related algorithms. However, such kind of codebook generation aims to find a limited number of (Gaussian) prototype code vectors in the feature space covering the entire training data which usually comprises data of one single language. Moreover, in conventional multilingual applications all Gaussians of multiples codebooks generated for different languages have to be searched during a recognition process. In particular, in embedded systems characterized by rather limited computational resources this can result in an inconvenient or even unacceptable processing time. In addition, when a new language has to be recognized that is not already considered by a particular speech recognition means exhaustive training on new speech data has to be performed which is not achievable by embedded system with limited memory and processor power.

SUMMARY OF THE INVENTION

In view of the above, embodiments of the invention provide a method for generating a multilingual acoustic model. The multilingual acoustic model requires a main/first acoustic model having a set of probability distribution functions (e.g. Gaussians) and a probabilistic state sequence model (e.g. Hidden Markov Model, HMM) comprising states. The multilingual acoustic model also includes at least one second acoustic model having a set of probability distribution functions (e.g. Gaussians) and a probabilistic state sequence model (e.g. Hidden Markov Model, HMM) comprising states. It should be recognized by one of ordinary skill in the art that other probability distribution functions in addition to Gaussian distributions may be used with the disclosed methodology and similarly different probabilistic state sequence models may be employed that are not Hidden Markov Models) without deviating from the intention scope of the invention. The methodology replaces each of the second Gaussians of the at least one second acoustic model by one of the first Gaussians and/or each of the second states of the second HMM of the at least one second acoustic model with the first HMM of the main acoustic model to obtain at least one modified second acoustic model. The substations are based upon a criteria set and the criteria set may be a distance measurement. The main acoustic model and the at least one modified second acoustic model are combined to obtain the multilingual acoustic model.

The first and the second acoustic models are each trained for a different language based on speech data as known in the art. The speech data is usually provided by one or more respective native speakers. For example, the main acoustic model may be configured to recognize speech inputs in English and the second one may be configured to recognize speech inputs in French or German. According to the present invention the main acoustic model is not modified in order to generate a multilingual acoustic model. The language recognized by the main acoustic model may be considered the main language, e.g., the language of a native user of a device incorporating the present invention. More than one second acoustic models configured for different languages other than the main language can be combined after the above-mentioned modification(s) with the unmodified main acoustic model in order to obtain the multilingual acoustic model based on a multilingual acoustic model comprising Gaussians of the main acoustic model only (according to this embodiment) for both the recognition of a language for which the main acoustic model was provided and a different language for which the second acoustic model was provided.

Each of the speech recognizers is conventionally configured to recognize a speech input based on: a) an acoustic model comprising a codebook consisting of Gaussians and a trained Hidden Markov Model (HMM) comprising states; and b) a language (grammar) model describing the probability/allowance of consecutive words and/or sentences in a particular language.

The Gaussians represent well-known probability distributions describing typical sounds of human speech in a particular language. The Gaussians may be considered as vectors, i.e. a Gaussian density distribution of feature vectors related to features as the pitch, spectral envelope, etc. and generated for each language by some technique as known in the art. The HMMs produce likelihoods of sequences of single speech fragments represented by the Gaussians. In particular, the HMMs may represent phonemes or allophones. The actual pronunciation of a word of a language can be represented as an HMM sequence.

When a single word is recognized by one of the speech recognizers (be it the first recognizer, the at least one second recognizer or the multilingual acoustic model generated in accordance with the present invention), the recognition result is the sequence of HMMs that produces the highest overall likelihood of all HMM sequences allowed by the language model, for example. In some more detail, the HMMs might consider all Gaussians according to weights being part of the acoustic model and saved in so-called "B-matrices". An HMM is split into several states each of which having a separate B-matrix (see also detailed description below).

The computational costs of speech recognition in terms of processor load, processing speed and memory demand depends on the number of different active HMM states and the number of Gaussians. The generation of the multilingual acoustic model from multiple conventionally trained monolingual according to the herein disclosed method can readily be performed on-the-fly even on embedded systems with restricted computational resources. New languages can easily be added to an existing multilingual acoustic model.

According to the above-described embodiment of the inventive method for generating a multilingual acoustic model for speech recognition of speech inputs in different languages the multilingual acoustic model is generated by comprising/maintaining not all Gaussians of two or more speech recognizers provided for different languages but only Gaussians of the main acoustic model configured for recognition of a first/main/mother language. In fact, according to this embodiment not one single Gaussian from a speech recognizer configured for recognition of a speech input in a language different from the main language is comprised in the multilingual acoustic model. The number of possible active HMM states in the achieved multilingual acoustic model remains the same as in the main acoustic model provided for the main language.

The resulting multilingual acoustic model can be used for fast and relatively reliable multilingual speech recognition of speech inputs of different languages in the embedded systems in a reasonable processing time. Since the main acoustic model was maintained without modification the multilingual acoustic model works optimally for the corresponding main language usually used by a native speaker and worse for other languages. However, experimental studies have proven that in most cases the overall performance of the multilingual acoustic model is acceptable for speech inputs in languages other than the main language.

Alternatively or supplementary to replacing the second Gaussians of the second acoustic model of the at least one second acoustic model by the respective closest first Gaussians of the unmodified main acoustic model of the main acoustic model the states of the second HMM of the at least one second acoustic model are replaced with the respective closest states of the first HMM of the main acoustic model to obtain at least one modified second acoustic model an, eventually, the desired multilingual acoustic model.

Whereas, in principle, any kind of distance measure known in the art can be used to determine the respective closest Gaussians or states, according to an example the closest Gaussians are determined based on the Mahalanobis distance. This distance measure provides an efficient means for determining closest Gaussians and results in a successful multilingual acoustic model. Closest states of the HMMs, on the other hand, may be determined based on the Euclidian distances of the states of the second HMM to the states of the first HMM, i.e. states from different languages (see detailed description below).

Alternatively or supplementary to replacing Gaussians and/or states of HMMs the second HMM of the at least one second acoustic model may be replaced by the closest HMM of the main acoustic model in order to obtain the multilingual acoustic model. The closest HMM can for example be determined by the minimum sum of distances between the states of two HMMs. Another possibility would be to compare the expected values of HMMs.

Thus, generating a speech recognizer that includes a multilingual acoustic model may include providing a main acoustic model comprising a main acoustic model consisting of first Gaussians and a first Hidden Markov Model (HMM). The HMM may include first states. The method includes providing a second acoustic model that includes a second acoustic model consisting of second Gaussians and a second Hidden Markov Model. The second HMM includes second states. The mean vectors of states are determined for the first states of the first HMM of the main acoustic model. The HMMs of the main acoustic model are determined based on the determined mean vectors of states. The second HMM of the at least one second acoustic model are replaced by the closest HMM of the main acoustic model (by the particular HMM of main acoustic model determined based on the determined mean vectors of states that is closest to the HMM of the second acoustic model) to obtain at least one modified second acoustic model. The main acoustic model and the at least one modified second acoustic model are combined to obtain the multilingual acoustic model.

In this embodiment, the at least one modified second acoustic model may be obtained by also replacing each of the second Gaussians of the at least one second acoustic model by the respective closest one of the first Gaussians and/or each of the second states of the second HMM of the at least one second acoustic model with the respective closest state of the first HMM of the main acoustic model to obtain the at least one modified second acoustic model.

According to examples of the inventive method two or three modified second acoustic models are generated by means of the above-described procedures of replacing Gaussians, states of HMMs and HMMs by the first Gaussians of the main acoustic model, the states of the first HMM and the HMMs of the main acoustic model generated from mean vectors of states for the first states of the first HMM of the main acoustic model, respectively, and the multilingual acoustic model is obtained by weighting the two or three modified second acoustic models and subsequently combining the weighted modified second acoustic models with the main acoustic model.

For example, a first modified second acoustic model may be generated by replacement of the Gaussians and a second modified second acoustic model by replacement of HMM states as described above and the first (unmodified) speech recognizer and the first modified second acoustic model weighted by a first weight (e.g., chosen from 0.4 to 0.6) and the second modified second acoustic model weighted by a second weight (e.g., chosen from 0.4 to 0.6) are combined with each other to obtain the multilingual acoustic model.

According to another example, a first modified second acoustic model may be generated by replacement of the Gaussians, a second modified second acoustic model by replacement of HMM states and a third modified second acoustic model by replacement of the second HMM as described above and the first (unmodified) speech recognizer and the first modified second acoustic model weighted by a first weight, the second modified second acoustic model weighted by a second weight and the third modified second acoustic model weighted by a second weight are combined with each other to obtain the multilingual acoustic model. Adjustment of the weights may facilitate fine-tuning of the achieved multilingual acoustic model and assist in improving the reliability of recognition results of speech inputs in different languages in different actual applications.

As already mentioned above, speech inputs in the main language for which the main acoustic model is trained are recognized by means of the achieved multilingual acoustic model with the same reliability as with the main acoustic model. Recognition results for speech inputs in other languages tend to be worse. In view of this, according to an embodiment the main acoustic model is modified by modifying the main acoustic model before combining it with the at least one modified second acoustic model to obtain the multilingual acoustic model, wherein the step of modifying the main acoustic model comprises adding at least one of the second Gaussians of the second acoustic model of the at least one second acoustic model to the main acoustic model. Thereby, recognition results for speech inputs in a language other than the main language for which the main acoustic model is trained are improved.

Advantageously, such Gaussians of the second acoustic model of the at least one second acoustic model are added to the codebook of the generated multilingual acoustic model that are very different from the first Gaussians of the main acoustic model. In particular, a sub-set of the second Gaussians of the second acoustic model is added to the main acoustic model based on distances between the second and the first Gaussians. In this case, the distances between the second and the first Gaussians are determined and at least one of the second Gaussians is added to the main acoustic model that exhibits a predetermined distance from one of the first Gaussians that is closest to this particular at least one of the second Gaussians.

The distance can be determined by means of the Mahalanobis distance or the Kullback-Leibler divergence or by minimizing the gain in variance when a particular additional code vector is merged with different particular code vectors of the main language codebook, i.e. when the respective (merging) code vectors are replaced by a code vector that would have been estimated from the training samples of both the main language codebook and the additional codebook that resulted in the code vectors that are merged. It is noted that based on experiments performed by the inventors the Mahalanobis distance has been proven to be a very suitable measure in this context.

By means of the multilingual acoustic model according to one of the above-described examples speech recognition of speech inputs in different languages can be performed even in embedded systems with restricted computational resources. Thus, it is provided a method for speech recognition comprising speech recognition based on a multilingual acoustic model provided by a method of one of the above-described examples. Speech recognition can be realized by a speech recognition means or speech dialog system or speech control system comprising a multilingual acoustic model generated by the method according to one of the above-described examples.

Herein, it is further provided an audio device, in particular, an MP3 or MP4 player, a cell phone or a Personal Digital Assistant, or a video device comprising a speech recognition or speech dialog system or speech control system means comprising a multilingual acoustic model generated according to the method according to one of the above-described examples.

Furthermore, it is provided a computer program product, comprising one or more computer readable media having computer-executable instructions for performing the steps of the method according to one of the above-described examples.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

In the following disclosure, the examples use Gaussian distributions as examples of probability distribution functions and Hidden Markov Models as examples of probabilistic state models. However other probability distribution functions and probabilistic state models may be employed without deviating from the scope of the invention. Similarly, the disclosure references distance measurements as examples of a comparison criteria set. Other criteria sets may be employed for comparing two or more values without deviating from the scope of the invention.

Figure 1:
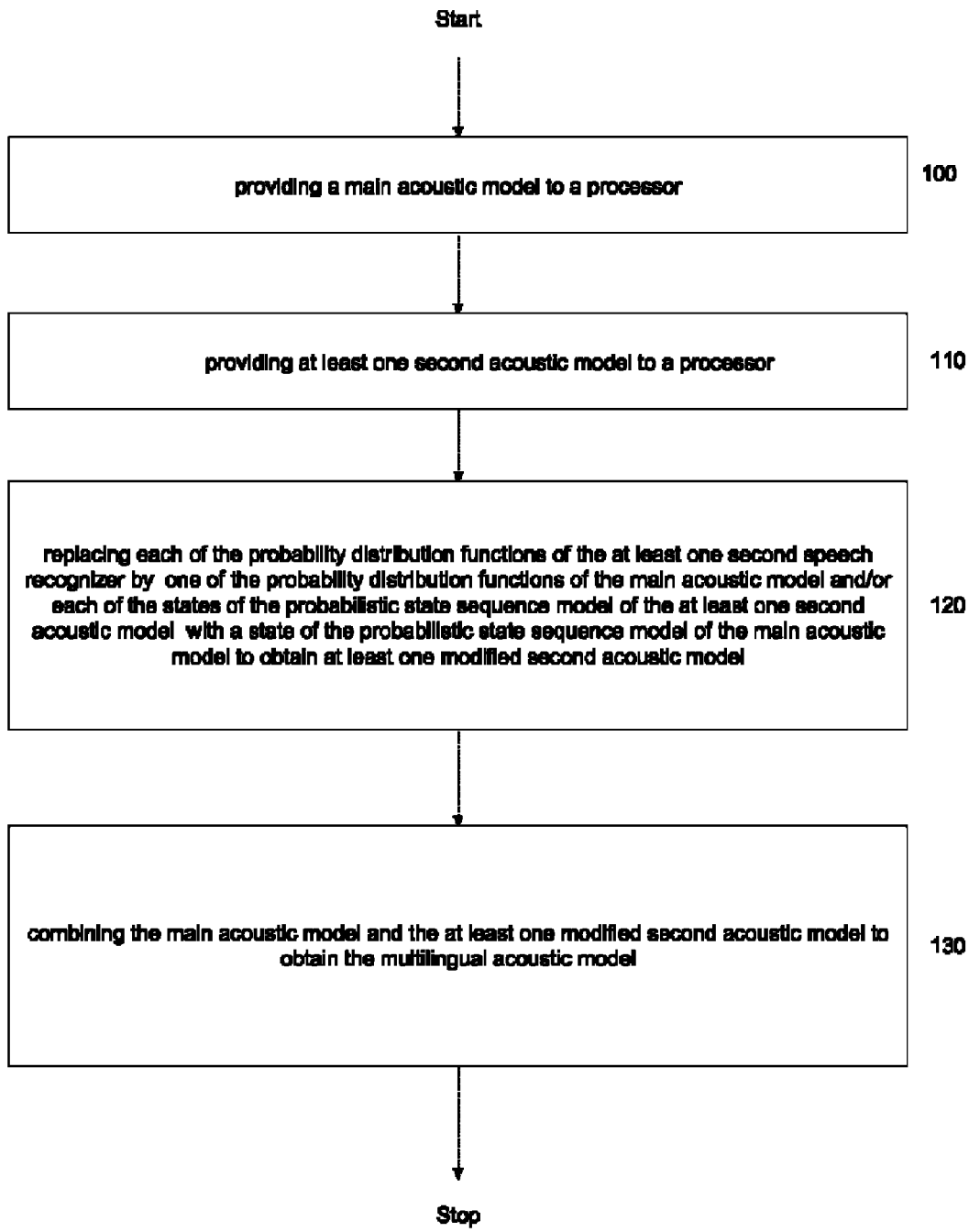
FIG. 1 is a flow chart of a method for generating a multilingual acoustic model from a plurality of monolingual speech recognizers.

FIG. 1 is a flow chart that demonstrates a method for generating a multilingual acoustic model that includes a multilingual acoustic model. The multilingual acoustic model is formed from two or more speech recognizers that each include a plurality of Gaussian distributions and associated Hidden Markov Models. The main acoustic model is retrieved from a memory location and provided to a processor. The main acoustic model is generally directed to the language of a native speaker. The second acoustic model is retrieved from memory and provided to the processor. The second acoustic model is generally directed to a foreign language. The processor then replaces each of the second Gaussians of the at least one second acoustic model by the respective closest one of the first Gaussians and/or each of the second states of the second HMM of the at least one second acoustic model with the respective closest state of the first HMM of the main acoustic model to obtain at least one modified second acoustic model. The processor then combines the main acoustic model and the at least one modified second acoustic model to obtain the multilingual acoustic model. As a result, only the Gaussians and HMMs of the native language speech recognizer are used.

Figure 2:
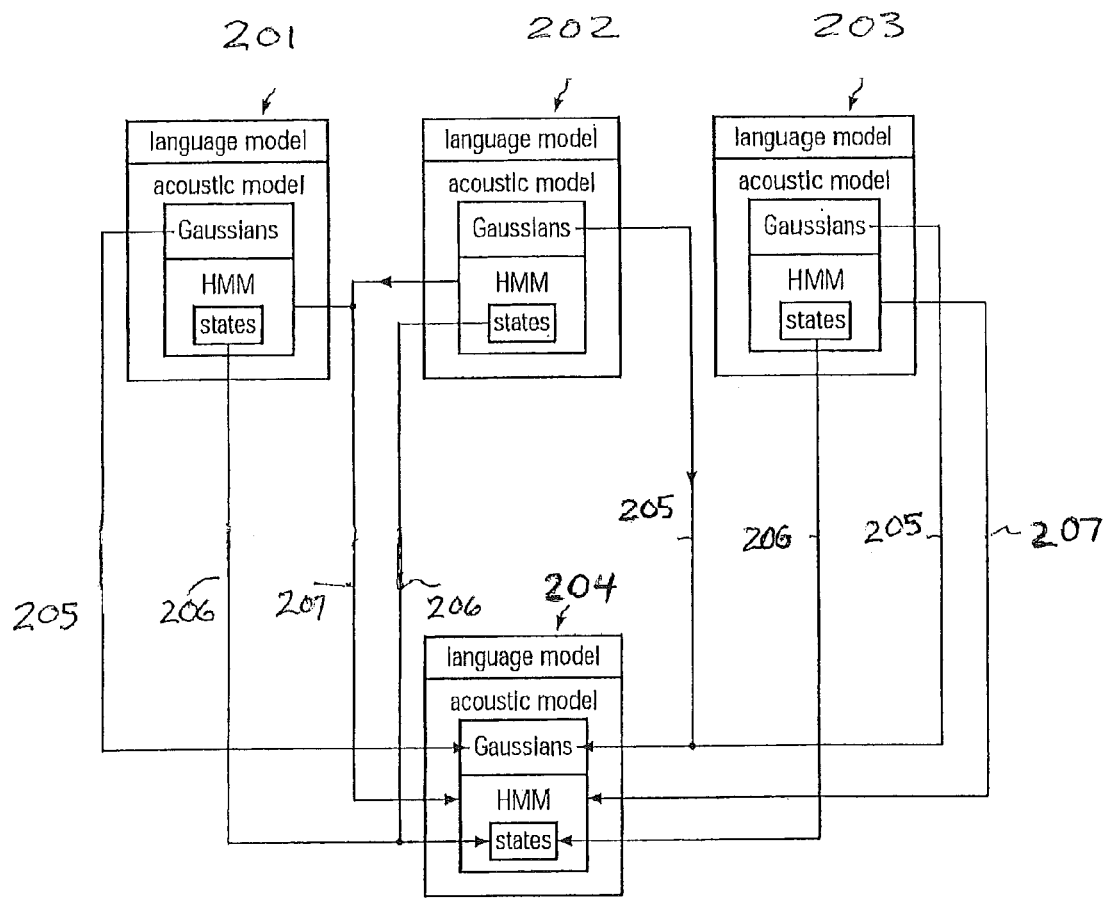
FIG. 2 is a block diagram that shows the mapping of the Gaussians and HMM between speech recognizers.

In the following, an example for the creation of a multilingual acoustic model based on a multilingual acoustic model (multilingual HMMs) from a number of monolingual speech recognizer/acoustic models according to the present invention is described with reference to FIG. 2. Multilingual HMMs are created by mapping the HMMs of speech recognizers provided for different languages to the Gaussians of one predetermined speech recognizer provided for another, main language. Consider an example of n speech recognizers 201 provided for n different languages and indicated by reference numerals 201, 202, 203 and 204 in FIG. 2. It goes without saying that different from the shown example more than four speech recognizers in total can be employed. It should be recognized by one of ordinary skill in the art that the mapping process may occur in a processor wherein the various models are stored in memory. The resultant multilingual acoustic model can then be used for recognizing speech inputs on the processor or the multilingual acoustic model may be ported to an embedded system or to another processor for use therewith.

Each speech recognizer comprises a language model and an acoustic model as known in the art. The respective acoustic models comprise Gaussians corresponding to speech fragments of the respective languages and organized in codebooks as well as HMMs representing phonemes. Each HMM model of each speech recognizer considers the likelihoods the Gaussians produce and adds additional likelihoods for accounting for changing from one HMM to another. Recognition of a particular spoken word provides a recognition result representing a sequence of HMM models giving the highest overall likelihood of all HMM sequences allowed according to the language model. Moreover, each HMM is split into a predetermined number of (HMM/language) states each of which is linked to a different B matrix including weights associated with the respective Gaussians.

According to the present example, the speech recognizer indicated by the reference number 204 corresponds to a language that is considered the main (native) language and recognition of utterances in that main language shall not be affected when performed based on the new multilingual acoustic model that is to be created. In the following, the set of Gaussians of speech recognizer 204 is also denoted as recognition codebook. All Gaussians of all the other n−1 speech recognizers 201, 202 and 203 are mapped 205 to the Gaussians of the speech recognizer 204 as described in the following. Each Gaussian is characterized by its mean μ and covariance matrix Σ. In this example, mapping 205 is based on the well-known Mahalanobis distance measure:

$$\mathrm{map}_G(G^i_{MC}) = G^j_{RC}, 0 \leq i \leq M, 0 \leq j \leq N$$

with $$D_G(\mu^i_{MC}, \mu^j_{RC}, \Sigma^i_{MC}) \leq D_G(\mu^i_{MC}, \mu^k_{RC}, \Sigma^i_{MC}) \forall k, \text{ with } 1 \leq k \leq N, k \neq j.$$

In the above-used notation the indices i, j, k indicate the respective individual Gaussians and RC and MC denote the recognition codebook (for the primary language) and the respective monolingual codebooks of the speech recognizers 201, 202, and 203. All states from HMMs corresponding to the language that corresponds to speech recognizer 204 map to Gaussians of the recognition codebook (of the speech recognizer 204) only. Thus, when all states 's' of all HMMs of all the other recognizers 201, 202 and 203 are mapped to 'S' HMM/language states represented by speech recognizer 204 only Gaussians of the recognition codebook of recognizer 204 are used for any recognition process based on the multilingual acoustic model that is to be generated.

The mapping 206 of HMM/language states of the HMMs, according to the present example, is performed based on the minimum Euclidean distance measure ($D_{Eu}$) between expected values of the probability distributions of the states. Here, it is assumed that the probability distribution $p_s$ of every state s of an HMM is a Gaussian mixture distribution. It is, furthermore, assumed that all MCs have N Gaussians and each state has N weights w. Then, the probability distribution $p_s$ of every state s is given by $$p_s(x) = \sum_{i=0}^{N} w_i * G(x, \mu_i, \Sigma_i).$$

The expectation value for each state s can readily be obtained by $$E(p_s(x)) = \sum_{i=0}^{N} E(w_i^s * G(x, \mu_i, \Sigma_i)) = \sum_{i=0}^{N} w_i^s * \mu_i.$$

Thus, the distance $D_S$ between two particular states $s^1$ and $s^2$ can be defined by $$D_s(s^1, s^2) = D_{Eu}(E(p_{s^1}), E(p_{s^2})).$$

In the present example, each speech recognizer has its own Linear Discriminant Analysis (LDA) transformation. Since the above-equation is correct only, if all states refer to Gaussians in the same feature space (language), the LDA is reversed before calculation of the distance $D_S$ between states from different languages.

With the distance $D_S$ as given above the state based mapping can be performed according to $$\mathrm{map}_s(s^i) = s^j_{RS}, 0 \leq i \leq S, 0 \leq j - RS$$

$$D_S(s^i, s^j_{RS}) \leq D_S(s^i, s^k_{RS}) \forall k, \text{ with } 1 \leq k \leq RS, k \neq j.$$

Based on the distances between the states of the HMMs a distance between entire HMMs can be calculated. If, for example, each (context dependent) phoneme is represented by a three state HMM, the distance between two phonemes $q_i$ and $q_2$ is given by $$D_H(q_1, q_2) = \sum_{i=1}^{3} D_S(s^i_{q_1}, s^i_{q_2}).$$

Similar to the mapping of Gaussians 205 and the state based mapping 206 described above, HMM mapping 207 from the HMMs of speech recognizers 201, 202 and 203 to speech recognizer 4 can be performed. According to the present invention, one of the three kinds of mapping or any combination of these mappings can be used in order to achieve the desired multilingual model.

Experimental studies have shown that, e.g., a combination of the mapping of Gaussians and HMM states at equal weights results in a reliable multilingual acoustic model. A combined mapping of Gaussians and states of HMMs based on $D_G$ and $D_S$ can realized by $$map_{G+S}(s^i) = \gamma_{G+S} map_S(s^i) + (1-\gamma_{G+S}) \begin{pmatrix} w_{s^i}^1 & map_G(G_{MC}^1) \\ w_{s^i}^2 & map_G(G_{MC}^2) \\ & M \\ w_{s^i}^N & map_G(G_{MC}^N) \end{pmatrix},$$

$\forall i$ with $1 \leq i \leq S$, where $\gamma_{G+S}$ is the weight of the combined mapping ($\gamma_{G-S}=0.5$ for an equally weighted mapping). For a given application, the weight $\gamma_{G+S}$ can be determined by experiments. In any case, no retraining of the resulting multilingual acoustic model is necessary after the mapping process.

The embodiments of the invention described above are intended to be merely exemplary; numerous variations and modifications will be apparent to those skilled in the art. All such variations and modifications are intended to be within the scope of the present invention as defined in any appended claims.

It should be recognized by one of ordinary skill in the art that the foregoing methodology may be performed in a signal processing system and that the signal processing system may include one or more processors for processing computer code representative of the foregoing described methodology. The computer code may be embodied on a tangible computer readable medium i.e. a computer program product.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an embodiment of the present invention, predominantly all of the reordering logic may be implemented as a set of computer program instructions that is converted into a computer executable form, stored as such in a computer readable medium, and executed by a microprocessor within the array under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.).

What is claimed is:

1. A computer-implemented method for generating a multilingual acoustic model for use in a speech recognition system, comprising:

providing to a processor from memory a main acoustic model for a first language including a set of probability distribution functions and a probabilistic state sequence model;

providing to the processor from memory at least one second acoustic model for a second language including a set of probability distribution functions and a probabilistic state sequence model;

in a computer process, replacing each of the probability distribution functions of the at least second acoustic model by one of the probability distribution functions from the main acoustic model and/or each state of the probabilistic state sequence model from the second acoustic model by a state of the probabilistic state sequence model from the main acoustic model based upon a criteria set to form a modified second acoustic model;

in a computer process, replacing each of the second probability distribution functions of the at least one second acoustic model by the respective closest one of the first probability distribution functions to obtain a first modified second acoustic model;

in a computer process, replacing each of the second states of the second probabilistic state sequence model of the at least one second acoustic model with the respective closest state of the first probabilistic state sequence model of the main acoustic model to obtain a second modified second acoustic model;

in a computer process, weighting the first modified second acoustic model by a first weight;

in a computer process, weighting the second modified second acoustic model by a second weight; and in a computer process, combining the first modified second acoustic model weighted by the first weight and the second modified second acoustic model weighted by the second weight and the main acoustic model to obtain the multilingual acoustic model.

2. A computer-implemented method for generating a multilingual acoustic model for use in a speech recognition system, comprising:
providing to a processor from memory a main acoustic model for a first language including a set of probability distribution functions and a probabilistic state sequence model;
providing to the processor from memory at least one second acoustic model for a second language including a set of probability distribution functions and a probabilistic state sequence model;
in a computer process, replacing the second probabilistic state sequence model of the at least one second acoustic model by the closest probabilistic state sequence model of the main acoustic model to obtain a first modified second acoustic model;
in a computer process, replacing each of the second probability distribution functions of the at least one second acoustic model by the respective closest one of the first probability distribution functions or replacing each of the second states of the second probabilistic state sequence model of the at least one second acoustic model with the respective closest state of the first probabilistic state sequence model of the main acoustic model to obtain a second modified second acoustic model;
in a computer process, weighting the first modified second acoustic model by a first weight;
in a computer process, weighting the second modified second acoustic model by a second weight; and
in a computer process, combining the first modified second acoustic model weighted by the first weight and the second modified second acoustic model weighted by the second weight and the main acoustic model to obtain the multilingual acoustic model.

3. The computer implemented method according to claim 2, wherein the first weight is chosen between 0.4 and 0.6 and the second weight is between 0.4 and 0.6.

4. A computer-implemented method for generating a speech recognizer comprising a multilingual acoustic model, comprising:
providing to a processor from memory a main acoustic model for a first language including a set of probability distribution functions and a probabilistic state sequence model;
providing to the processor from memory at least one second acoustic model for a second language including a set of probability distribution functions and a probabilistic state sequence model;
in a computer process, replacing the second probabilistic state sequence model of the at least one second acoustic model by the closest probabilistic state sequence model of the main acoustic model to obtain a first modified second acoustic model;
in a computer process, replacing each of the second probability distribution functions of the at least one second acoustic model by the respective closest one of the first probability distribution functions to obtain a second modified second acoustic model;
in a computer process, replacing each of the second states of the second probabilistic state sequence model of the at least one second acoustic model with the respective closest state of the first probabilistic state sequence model of the main acoustic model to obtain a third modified second acoustic model;
in a computer process, weighting the first modified second acoustic model by a first weight;
in a computer process, weighting the second modified second acoustic model by a second weight;
in a computer process, weighting the third modified second acoustic model by a third weight; and
in a computer process, combining the first modified second acoustic model weighted by the first weight, the second modified second acoustic model weighted by the second weight, the third modified second acoustic model weighted by the third weight and the main acoustic model to obtain the multilingual acoustic model.

5. A computer-implemented method for generating a multilingual acoustic model for use in a speech recognition system, comprising:
providing to a processor from memory a main acoustic model for a first language including a set of probability distribution functions and a probabilistic state sequence model;
providing to the processor from memory at least one second acoustic model for a second language including a set of probability distribution functions and a probabilistic state sequence model;
in a computer process, replacing each of the probability distribution functions of the at least second acoustic model by one of the probability distribution functions from the main acoustic model and/or each state of the probabilistic state sequence model from the second acoustic model by a state of the probabilistic state sequence model from the main acoustic model based upon a criteria set to form a modified second acoustic model; and
in a computer process, combining the main acoustic model and the at least one modified second acoustic model to form the multilingual acoustic model;
wherein the criteria set is a distance measurement determined based on the Mahalanobis distance between first and second probability distribution functions.

6. A computer program product comprising a non-transitory computer readable medium having executable computer code thereon for generating a speech recognizer comprising a multilingual acoustic model, the computer code comprising:
computer code for retrieving a main acoustic model for a first language including first probability distribution functions and a probabilistic state sequence model having states;
computer code for retrieving at least one second acoustic model for a second language including probability distribution functions and a probabilistic state sequence model including states;
computer code for replacing each of the probability distribution functions of the at least one second acoustic model by the respective closest one of the first probability distribution functions to obtain a first modified second acoustic model;
computer code for replacing each of the states of the probabilistic state sequence model of the at least one second acoustic model with the respective closest state of the probabilistic state sequence model of the main acoustic model to obtain a second modified second acoustic model;
computer code for weighting the first modified second acoustic model by a first weight;
computer code for weighting the second modified second acoustic model by a second weight; and
computer code for combining the first modified second acoustic model weighted by the first weight and the second modified second acoustic model weighted by the second weight and the main acoustic model to obtain the multilingual acoustic model.

7. A computer program product comprising a non-transitory computer readable medium having executable computer code thereon for generating a speech recognizer comprising a multilingual acoustic model, the computer code comprising:

computer code for retrieving a main acoustic model for a first language including first probability distribution functions and a probabilistic state sequence model having states;

computer code for retrieving at least one second acoustic model for a second language including probability distribution functions and a probabilistic state sequence model including states;

computer code for replacing the probabilistic state sequence model of the at least one second acoustic model by the closest probabilistic state sequence model of the main acoustic model to obtain a first modified second acoustic model;

computer code for replacing each of the probability distribution functions of the at least one second acoustic model by the respective closest one of the probability distribution functions from the main acoustic model to obtain a second modified second acoustic model;

computer code for replacing each of the states of the probabilistic state sequence model of the at least one second acoustic model with the respective closest state of the probabilistic state sequence model of the main acoustic model to obtain a third modified second acoustic model;

computer code for weighting the first modified second acoustic model by a first weight;

computer code for weighting the second modified second acoustic model by a second weight;

computer code for weighting the third modified second acoustic model by a third weight; and computer code for combining the first modified second acoustic model weighted by the first weight, the second modified second acoustic model weighted by the second weight, the third modified second acoustic model weighted by the third weight and the main acoustic model to obtain the multilingual acoustic model.

* * * * *